United States Patent [19]

Takeyama et al.

[11] 4,162,299

[45] Jul. 24, 1979

[54] PROCESS FOR THE REMOVAL OF SULFUR OXIDES

[75] Inventors: Tetsu Takeyama, Kyoto; Akio Takahashi; Kiichiro Matsumura, both of Otsu; Keiya Kitagawa, Minoo, all of Japan

[73] Assignee: Toray Engineering Co., Ltd., Osaka, Japan

[21] Appl. No.: 866,855

[22] Filed: Jan. 4, 1978

[51] Int. Cl.$^2$ .............................................. C01B 17/00
[52] U.S. Cl. .................................................. 423/242
[58] Field of Search ................ 423/242, 244 A, 244 R

[56] References Cited

U.S. PATENT DOCUMENTS

| 2,434,868 | 1/1948 | Sample | 423/242 |
| 3,943,230 | 3/1976 | Yamamichi et al. | 423/242 |

FOREIGN PATENT DOCUMENTS 51-28586   8/1976   Japan.

OTHER PUBLICATIONS

Bureau of Mines Report 5735, Bienstock et al., pp. 8-11, 1961.

Primary Examiner—O. R. Vertiz
Assistant Examiner—G. A. Heller

[57] ABSTRACT

Sulfur oxides are removed from waste gases containing the same by scrubbing the waste gas with an aqueous scrubbing solution containing the aluminate of sodium, potassium or ammonium and an additional compound selected from the group consisting of aluminum sulfate and alum.

4 Claims, 5 Drawing Figures

PROCESS FOR THE REMOVAL OF SULFUR OXIDES

BACKGROUND OF THE INVENTION

1. Field of the Invention

The present invention relates to a process for removing sulfur oxides, $SO_x$ (i.e. $SO_2$ and $SO_3$) from a waste gas, and more specifically relates to the improvement in a process for removing sulfur oxides from a waste gas containing the same by scrubbing the gas with an aqueous scrubbing solution containing aluminate.

2. Description of the Prior Art

It is known that sulfur oxides can be scrubbed with aluminate such as sodium aluminate, as disclosed in Japanese Laid-Open Patent Application (KOKAI) No. SHO49-126568 (1974). However, this process has the disadvantage that, since $Al(OH)_3$ is precipitated according to, for example, equation (1) below, with the absorption of $SO_x$ into the scrubbing solution, the scrubbing solution becomes slurry.

$$2NaAlO_2 + SO_2 + 3H_2O \rightarrow Na_2SO_3 + 2Al(OH)_3 \quad (1)$$

This causes various problems, such as the formation of scales in the scrubbing system, in the practical use of this process.

SUMMARY OF THE INVENTION

The objects of the present invention are to obviate the above-mentioned disadvantage of the known process for the removal of sulfur oxides from waste gases by using an aqueous scrubbing solution containing aluminate, and to provide a process for removing sulfur oxides from waste gases containing the same by using an aqueous scrubbing solution containing aluminate, without causing the various problems mentioned above during practical use in the scrubbing system and with good absorption efficiency.

Other objects and advantages of the present invention will be apparent from the following description.

In accordance with the present invention, there is provided a process for removing sulfur oxides from a waste gas containing the same comprising contacting said gas with an aqeous scrubbing solution containing aluminate and at least one additional compound selected from the group consisting of aluminum sulfate and alum, in an absorption column.

In accordance with the present invention, there is also provided a process for removing sulfur oxides from a waste gas containing the same comprising the steps of:

(a) contacting said gas with a circulating aqueous scrubbing solution containing aluminate and at least one additional compound selected from the group consisting of aluminum sulfate and alum in an absorption column, whereby said sulfur oxides contained in the gas are absorbed into said scrubbing solution;

(b) oxidizing at least a portion of the scrubbing solution by contacting the solution with air, oxygen or a gas containing oxygen; and (c) withdrawing a portion of the oxidized scrubbing solution from the system and returning the remainder of the oxidized scrubbing solution to the circulating scrubbing solution.

DESCRIPTION OF THE PREFERRED EMBODIMENTS

Figure 1:
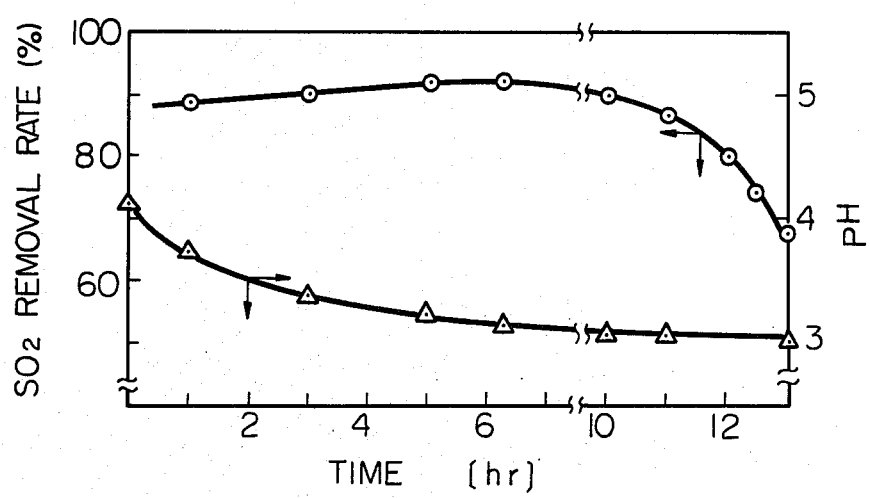

The aqueous scrubbing solution to be employed in the present invention should contain (i) aluminate and (ii) at least one additional compound selected from the group consisting of aluminum sulfate and alum.

The aluminate to be used in the present invention includes, for example, soidum aluminate, potassium aluminate, ammonium aluminate. Either metaaluminate $MAlO_2$ (wherein M represents Na, K and $NH_4$) or orthoaluminate $M_3AlO_3$ (wherein M is the same as defined above) can be acceptably used in the present process. That is, a mol ratio, $M_2O/Al_2O$, of the aluminate is within the range of from 1 to 3. For instance, sodium aluminates having the $M_2O/Al_2O_3$ mol ratio of 1 to 2.7 are commercially available. These commercial aluminates can be used, as one component of the scrubbing agent of this invention, by themselves or after adjusting the mol ratio to the desired value.

The additional compound (i.e. aluminum sulfate and/or alum) to be used in the present invention is preferably present in the aqueous scrubbing solution in a concentration of approximtaly 1 through 30% by weight. When the concentration of aluminum sulfate or alum is less than 1% by weight, the formation of the precipitate of $Al(OH)_3$ remarkably increases. On the other hand, when the concentration of aluminum sulfate or alum is above 30% by weight, an unpreferable increase in the viscosity of the scrubbing solution occurs. The aluminum sulfate to be employed in the present invention can be in the form of hydrates or anhydride.

The alum to be used in the present invention includes, for example, sodium alum $NaAl(SO_4)_2.12H_2O$, potassium alum $K\ Al(SO_4)_2.12H_2O$ and ammonium alum $NH_4Al(SO_4)_2.12H_2O$, as well as anhydrides thereof. If the alum is used as an additional component of the scrubbing solution, it is preferable to use an alum containing such a monovalent cation as is present in the aluminate to be used, as the other component, in the scrubbing solution.

The aluminate to be used in the present invention may be suitably added to the scrubbing solution containing the aluminum sulfate and/or alum so as to control the pH of the scrubbing solution to within the range of 2 to 4.5. When the pH of the scrubbing solution is below 2, the absorption efficiency of the scrubbing solution decreases very much and becomes insufficient. On the other hand, when the pH of the scrubbing solution is more than 4.5, the concentration of precipitates increases to such an extent that scrubbing operation can not be carried out without scaling troubles.

For instance, when the sodium metaaluminate $NaAlO_2$ is used, together with aluminum sulfate, as the scrubbing agent, the suitable mol ratio of $NaAlO_2/Al_2(SO_4)_3$ in the scrubbing solution is within the range of from approximately 0.01 to approximately 4.5. When the sodium metaalauminate is used, together with sodium alum $NaAl(SO_4)_2$, the suitable mol ratio of $NaAlO_2/NaAl(SO_4)_2$ is within the range of from approximately 0.01 to approximately 2.0.

In addition, in case aluminum sulfate or alum is formed in the scrubbing solution in the course of the $SO_x$ absorption reaction, the addition of the aluminum sulfate or alum to the scrubbing solution prior to the scrubbing operation is not necessarily required, so long as the above-mentioned concentration of the aluminum sulfate or alum is maintained during the scrubbing operation. If the $SO_x$ content present in the waste gas is fluctuates a great deal, the addition of a large excess of the aluminate should be avoided so as not to form the precipitate mentioned hereinbefore in the scrubbing system.

In order to remove $SO_x$ present in a waste gas by using the scrubbing solution containing (i) the aluminate and (ii) the aluminum sulfate or alum, the waste gas is usually brought into contact with the scrubbing solution at a temperature between the ambient temperture and approximately 90° C. The liquid-gas ratio in an absorption column is not specifically limited, but usually is within the range of from 0.5 to 30 liter/m³. The absorption apparatus to be used in the present invention may be of any conventional type such as, a bubbling column, a spray tower, a packed column, a plate column and the like. Two or more absorption apparatus can also be used in the present invention. The pressure under which the scrubbing operation is carried out is not specifically limited. The scrubbing operation can be conveniently carried out under either condition of atmospheric pressure or elevated pressure.

The $SO_x$ scrubbed in the absorption step becomes sulfite and bisulfite ions in the scrubbing solution, a portion of which ions is, in turn, oxidized into sulfate and bisulfate ions, respectively, by oxygen present in the waste gas to be treated. The remainder of the sulfite and bisulfite ions is preferably oxidized into sulfate and bisulfate ions, respectively, in the oxidation step by contacting the scrubbing solution containing sulfite and bisulfite ions with air, oxygen or a gas containing oxygen. Since the oxidation improves percent removal of $SO_x$ and produces a useful by product such as sluminum sulfate in the scrubbing system, the total concentrations of the sulfite and bisulfite ions in the scrubbing solution is preferably maintained at less than 0.5% by weight or, more preferably, at less than 0.1% by weight.

The oxidation step is preferably carried out under the conditions of a pH of the scrubbing solution of 2 through 4 and a temperature of from ambient temperature to 90° C., and more preferably, of from 40 to 70° C. The operation pressure to be employed in the oxidation step may be atmospheric pressure, but is preferably an elevated pressure.

The oxidizing agent to be employed in the oxidation step includes a gaseous oxidizing agent such as, for example, air, oxygen and a gas containing oxygen. The amount of the oxidizing agent to be fed every minute to the scrubbing solution may be suitably determined depending on a gas-liquid contacting efficiency of the oxidation step but, in general, is such that normal volume oxygen, contained in the oxidizing agent, is within the range of from 0.01 to 10%, more preferably, 0.05 to 5%, based on the volume of the scrubbing solution to be oxidized in the oxidation step. When the amount of the oxygen is below the lower limit of the above-mentioned range, the oxidation reaction rate is too small, whereas the use of the oxygen beyond the upper limit of the above-mentioned range is not economical. It should be understood that a method for supplying or blowing the oxidizing agent into the scrubbing solution should be such that a gas-liquid contact is effectively accomplished. In addition, a catalyst such as, for example, iron compounds, manganese compounds and the like can be advantageously used to increase the oxidation reaction rate.

The residence time of the scrubbing solution in the oxidation step is, in general, five minutes through two hours, although it depends on the amount of the oxidizing agent, the reaction temperature, the reaction pressure, the pH of the solution to be oxidized, the gas-liquid contact efficiency and the like. The oxidizing apparatus to be used in the present process may be any conventional type known in the art. For example, bubbling columns can be advantageously employed. The oxidation apparatus is usually installed separately from the absorption column. However, the oxidation step can be carried out in the same column as the absorption step. For instance, said gaseous oxidizing agent can be blown into the circulating scrubbing solution contained in the reservoir installed at the absorption apparatus. When two or more absorption columns are employed in the scrubbing system, it is preferable to feed the gaseous oxidizing agent into each of the scrubbing solution reservoirs.

If the oxidation step is carried out in the oxidation column installed separately from the absorption column, sulfur dioxide ($SO_2$) may be evolved from a portion of the bisulfite ion present in the scrubbing solution. The sulfur dioxide thus evolved together with the waste gaseous oxidizing agent, can be introduced to the absorption column for treatment.

A portion of the oxidized scrubbing solution thus obtained is withdrawn from the system as a by-product, and the remainder of the oxidized scrubbing solution is returned to the scrubbing system for use as the scrubbing agent again. The solution withdrawn as a by-product is, if desired, further oxidized.

The by-product solution thus obtained is a mixture of aluminum sulfate and sodium, potassium or ammonium sulfate, which is usable per se or after being concentrated in water-purification processes, paper sizing processes and the like.

The present invention is further illustrated by, but by no means limited to, the following Examples.

EXAMPLE 1

An absorption test was conducted by bubbling a simulated waste gas containing 1440 ppm of $SO_2$, 5% of $O_2$ and the balance of $N_2$ into an absorbing solution containing 10 g of $Al_2(SO_4)_3 \cdot 18H_2O$ and 4.6 g of $NaAlO_2$ in water. In the test, simulated waste gas having an ambient temperature was continuously blown into an air diffusing tube containing 100 ml of the absorbing solution maintained at a temperature of 60° C., for 13 hours, at a gas feed rate of 2 liter/min. The initial pH of the absorbing solution was 4.1.

The results so obtained are shown in explanatory graphs of FIG. 1, in which the $SO_2$ removal rate (%) and the pH of the absorbing solution are plotted against the lapse of time (hr.).

The amount of the precipitation after the completion of the test (i.e. after 13 hours bubbling) was only 0.1 g.

Comparative Example 1

Figure 2:
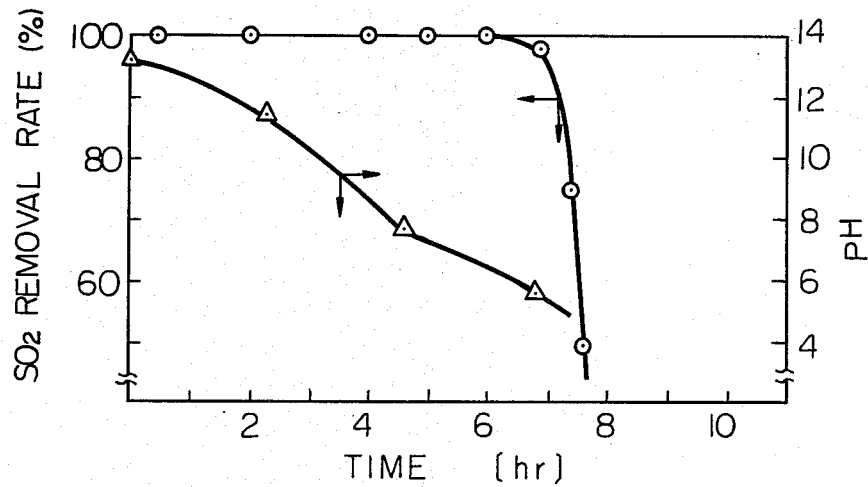

An absorption test was conducted as described in Example 1, except that 100 ml of an absorbing solution having an initial pH of 13 and containing 4.6 g of $NaAlO_2$ in water was used. The explanatory graphs of the $SO_2$ removal rate (%) and the pH of the absorbing solution with the lapse of time (hr.) are shown in FIG. 2.

After the completion of the test (i.e. after 7.5 hours of bubbling), 6.13 g of the precipitate was formed. This precipitate was baked in the air at a temperature of 550° C. for 3 hours to produce 2.88 g of $Al_2O_3$.

Since the theoretical amount of $Al_2O_3$ obtained according to the equation (1), mentioned hereinbefore, and the following equation (2) is 2.86 g, the precipitate formed after the completion of the test was considered to be $Al(OH)_3$.

$$2Al(OH)_3 \rightarrow Al_2O_3 + 3H_2O \qquad (2)$$

EXAMPLE 2

The absorption test of Example 1 was repeated, except that 100 ml of an absorbing solution having an initial pH of 4.0, and containing 28.4 g of $Al_2(SO_4)_3 \cdot 18H_2O$ and 15.0 g of $NaAlO_2$ in water was used.

Figure 3:
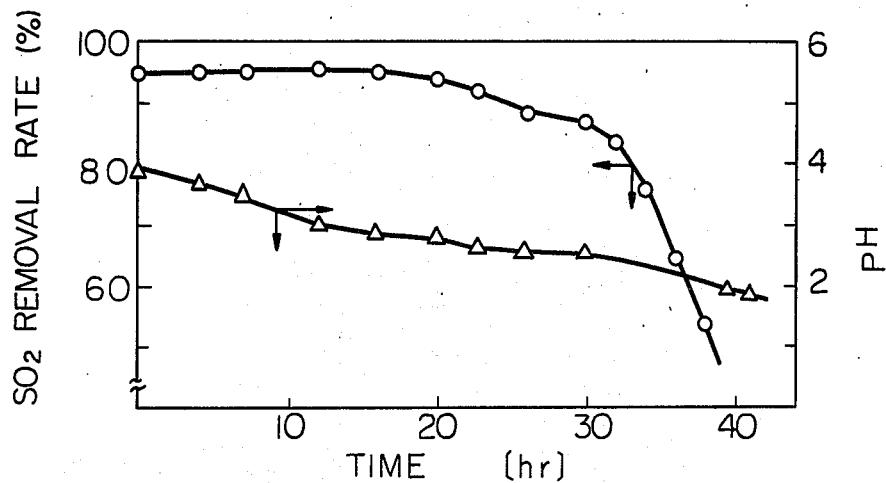

The results are shown in explanatory graphs of FIG. 3, in which the $SO_2$ removal rate (%) and the pH of the absorbing solution are plotted against the lapse of time (hr.). After the completion of the test (i.e. after 41 hours of bubbling) only a very small amount of the precipitate was found in the absorbing solution.

EXAMPLE 3

The absorption test of Example 1 was repeated, except that an absorbing solution having an initial pH of 4.3 and containing 37.8 g of $NaAl(SO_4)_2 \cdot 12H_2O$ and 12.0 g of $NaAlO_2$ dissolved in water was used.

The average desulfurization rate was 94% over a test period of 5.5 hours, and the pH of the absorbing solution was decreased down to 3.9. The desulfurization performance and the formation of the precipitate were much the same as those of Example 2.

EXAMPLE 4

Figure 4:
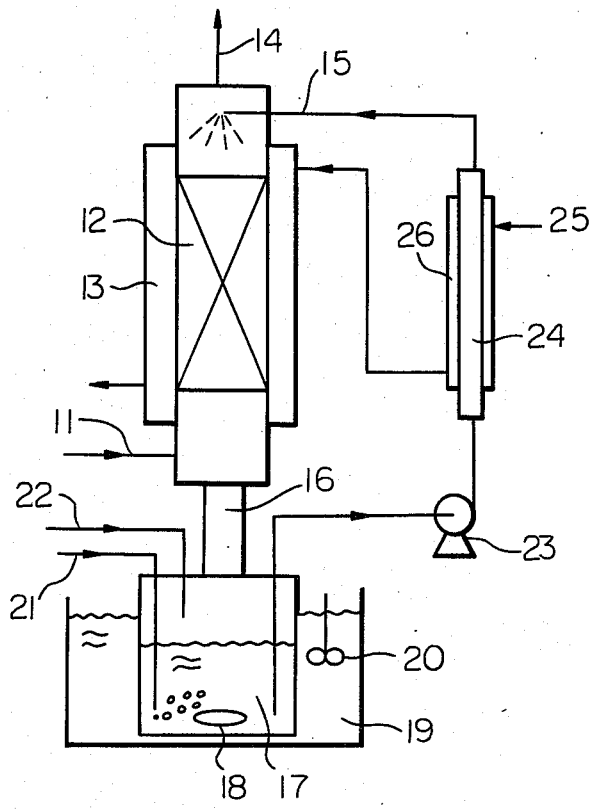

A gas scrubbing test was conducted by using an apparatus as illustrated in FIG. 4.

In the process flow shown in FIG. 4, a waste gas containing $SO_2$ was continuously fed through a gas inlet 11 into a packed type absorption column 12 made of glass (with an inner diameter of 25 mm$\phi$) and provided with a jacket 13. In the column 12 the gas was treated with a down-flowing aqueous scrubbing solution containing (i) aluminate and (ii) aluminium sulfate or alum. The treated gas was discharged through a gas outlet 14 of the column 12. On the other hand, the aqueous scrubbing solution was continuously fed from a liquid inlet 15 into the column 12 and recovered through a downcomer 16 into a reservoir 17.

The absorption column 12 was packed with 7 mm McMahon packings made of sus 316 to a height of 150 mm. Into the reservoir 17, with a diameter of 55 mm and a depth of 100 mm and provided with a magnetic stirrer 18, 150 ml of an aqueous scrubbing solution containing 30 g of $Al_2(SO_4)_3 \cdot 16-18H_2O$ and 15 g of $NaAlO_2$ in water was charged. The receiver 17 was placed into a water-bath 19 containing hot water at a temperature of 60° C. and provided with a mechanical stirrer 20.

The reservoir 17 was provided with a feed pipe 21, having a glass filter at the tip thereof, for feeding an oxidizing air and a feed pipe 22 for feeding the scrubbing solution. Thus, the air fed from the feed pipe 21 was contacted with the scrubbing solution contained in the receiver 17 to oxidize the sulfite ion and bisulfite ion. The air then flowed upward, through the downcomer 16, in the packed column 12, together with the waste gas fed through the gas inlet 11, and was discharged from the gas outlet 14.

The total gas flow rate was adjusted to 2 liter/min. by controlling the volume of air to be fed to lines 11 and 21. The total gas contained 1480 ppm of $SO_2$, 8% of $O_2$ and a balance of $N_2$. The circulating scrubbing solution was sucked from the reservoir 17 by means of a pump 23 and fed to the top of the packed column 12 through a heater 24 and a liquid inlet 15, at a feed rate of 10 ml/min. Jacket water 25 having a controlled temperature of 60° C. was circulated through a jacket 26 and the jacket 13. The retention time of the circulating scrubbing solution in the reservoir 17 was approximately 15 min. and the depth of the liquid in the receiver 17 was about 60 mm.

The desulfurization rates (%) obtained under the steady state operation of about one hour are shown in Table 1 below. The tests were conducted under various feed rates of the oxidizing air as listed in Table 1.

Table 1

| Feed rate of oxidizing air (ml/min) | $SO_2$ removal rate (%) |
|---|---|
| 0 | 74 |
| 25 | 90 |
| 100 | 91 |
| 200 | 91 |
| 400 | 92 |
| 500 | 92 |

EXAMPLE 5

The scrubbing test was carried out by using the apparatus shown in FIG. 4. Into the reservoir 17, 120 ml of water was charged and circulated through the packed column 12 by means of the pump 23. An aqueous sodium aluminate solution containing 19% by weight of $Na_2O$ and 20% by weight of $Al_2O_3$ was added from the line 22 so as to control the pH of the aqueous solution present in the receiver 17 to 2.6 through 4.0 (A pH meter was installed in the receiver 17 although it is not shown in FIG. 4), the temperatures of the water bath 19 and the jacket water being controlled to be 60° C. and 35° C., respectively.

On the other hand, a simulated waste gas containing 1580 ppm of $SO_2$, 7.4% of $O_2$ and the balance of $N_2$ was continuously fed through the gas inlet 11 into the packed column 12, at a feed rate of 1.9 liter/min. A hundred milliliter per minute of the oxidizing air was blown, through the line 21, into the reservoir 17.

The $SO_2$ removal rate exceeded 90% at about 3 hours after the start-up of the test and, thereafter, said aqueous sodium aluminate solution was added drop by drop to the reservoir 17 so as to maintain the average $SO_2$ removal rate at about 94% at a pH of 2.6 through 4.0. In the long run, 11.74 g of sodium aluminate was added over a period of 15 hours.

The scrubbing solution (pH 2.6) withdrawn after the completion of the test afforded sufficient flocculation effect with respect to waste water from a dyeing process.

EXAMPLE 6

Figure 5:
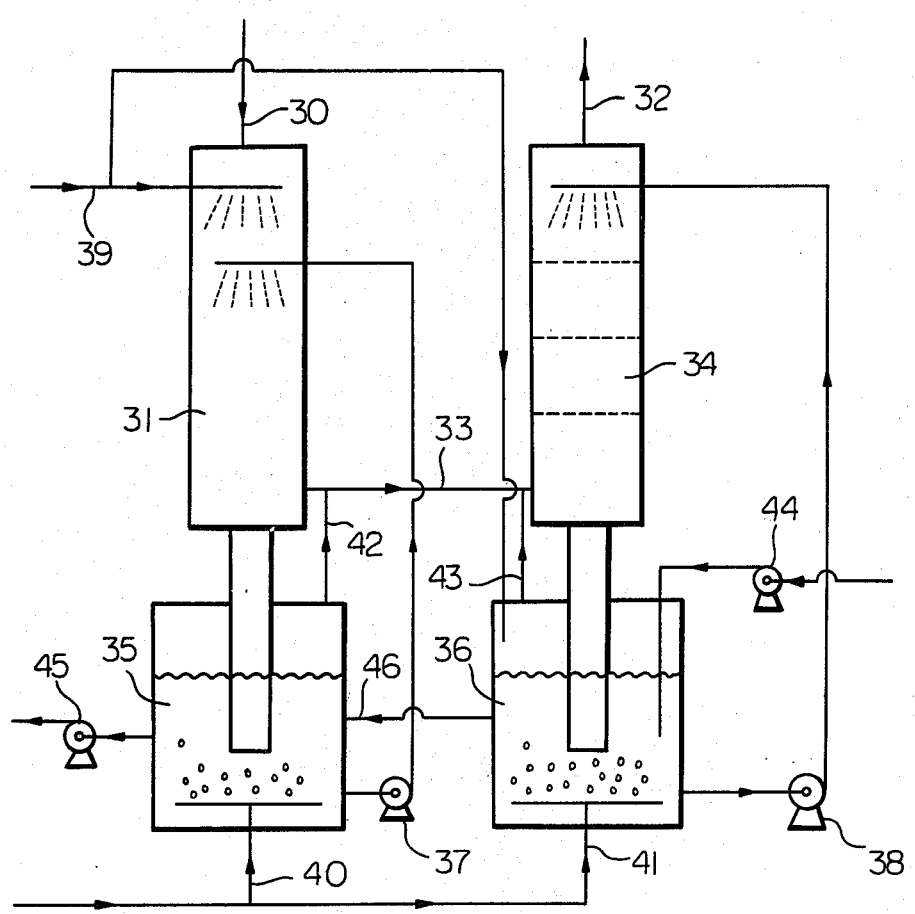

180 $Nm^3$/hr of waste gas from a boiler containing 440 ppm of $SO_2$ was desulfurized by using a process flow as illustrated in FIG. 5.

In the process flow illustrated in FIG. 5, the waste gas was fed, through a line 30, into the first absorption column 31 and exhausted from a line 32 via a line 33 and a second absorption column 34. The first and second absorption columns 31 and 34 were provided with first and second absorption column reservoirs 35 and 36, respectively, which also acted as the oxidation apparatus for the circulating scrubbing solution.

Circulating scrubbing solutions were introduced separately from the reservoirs 35 and 36 by means of pumps 37 and 38 to the first and second absorption columns 31 and 34, respectively. These solutions were contacted with the waste gas in the absorption columns 31 and 34, and were introduced into the reservoirs 35 and 36 again.

In addition, into the first absorption column 31, industrial water was fed through a line 39 to cool the waste gas. Air was introduced into the oxidation apparatus (i.e. the reservoirs 35 and 36) through lines 40 and 41, respectively. The exhausted air from reservoirs 35 and 36 was introduced into the line 33 through lines 42 and 43.

An aqueous sodium aluminate solution containing 19% by weight of $Na_2O$ and 20% by weight of $Al_2O_3$ was added to the reservoir 36 by a pump 44 so as to maintain the pH value of the scrubbing solution within a specified range. A by-product containing aluminum sulfate (i.e. a portion of the scrubbing solution contained in the first reservoir 35) was withdrawn from the reservoir 35 by a pump 45 and the corresponding amount of the scrubbing solution was transferred from the second reservoir 36 to the first reservoir 35.

The scrubbing test was carried out under the following conditions.

| | |
|---|---|
| The first absorption step: | |
| pH of the scrubbing solution | 2.75 |
| temperature of the scrubbing solution | 45° C. |
| liquid-gas ratio (L/G) | 2.7 liter/$Nm^3$ |
| The first oxidation step: | |
| amount of air fed | 2.0 $Nm^3$/hr |
| amount of by-product withdrawn | 5.5 liter/hr |
| The second absorption step: | |
| pH of the scrubbing solution | 3.1 |
| temperature of the scrubbing solution | 45° C. |
| liquid-gas ratio (L/G) | 3.8 liter/$Nm^3$ |
| The second oxidation step: | |
| amount of air fed | 2.0 $Nm^3$/hr |

The $SO_2$ content in off-gas from the line 32 was 20 ppm (the sulfurization rate 95.5%). The scrubbing solution withdrawn from the first oxidation step was filtered through a filter paper. The filtrate had the following properties.

| | |
|---|---|
| Transparency | 30 cm or more |
| $COD_{Mn}$ | 8 mg/liter |
| $COD_{Cr}$ | 40 mg/liter |
| $Na_2SO_4$ | 3.1 W/V% |
| $Al_2(SO_4)_3$ | 4.5 W/V% |

As a result of flocculation tests, in which wool scoring effluent was treated with this solution, it was shown that the flocculation property of this solution was comparable to that of commercial aluminum sulfate.

What we claim is:

1. A process for removing sulfur oxides from a waste gas containing said sulfur oxides, comprising contacting said gas with an aqueous scrubbing solution containing aluminate and at least one additional compound selected from the group consisting of aluminum sulfate and alum and having a pH of from 2 to 4.5, the concentration of said additional compound in the scrubbing solution being within the range of from 1 to 30% by weight.

2. The process as claimed in claim 1, wherein said aluminate is selected from the group consisting of sodium, potassium and ammonium aluminate and any mixture thereof.

3. A process for removing sulfur oxides from a waste gas containing said sulfur oxides comprising the steps of:
   (a) contacting said gas with a circulating aqueous scrubbing solution containing aluminate and at least one additional compound selected from the group consisting of aluminum sulfate and alum, and having a pH of from 2 to 4.5, in an absorption column, the concentration of said additional compound in the scrubbing solution being within the range of from 1 to 30% by weight, whereby said sulfur oxides contained in the gas are absorbed into said scrubbing solution;
   (b) oxidizing at least a portion of the scrubbing solution by contacting the solution with air, oxygen or a gas containing oxygen, and;
   (c) withdrawing a portion of the oxidized scrubbing solution from the system and returning the remainder of the oxidized scrubbing solution to the circulating scrubbing solution.

4. The process as claimed in claim 3, wherein said aluminate is selected from the group consisting of sodium, potassium and ammonium aluminate and any mixture thereof.

* * * * *